Aug. 11, 1964  C. A. MATTSON ETAL  3,143,842
GRASS CATCHER FOR ROTARY LAWN MOWER
Filed Dec. 26, 1962  3 Sheets-Sheet 3
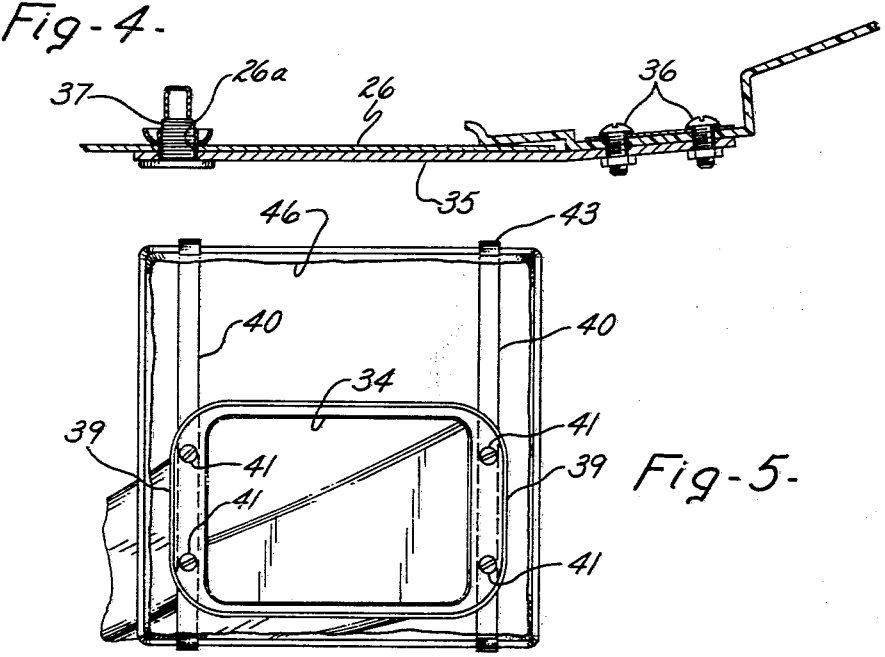
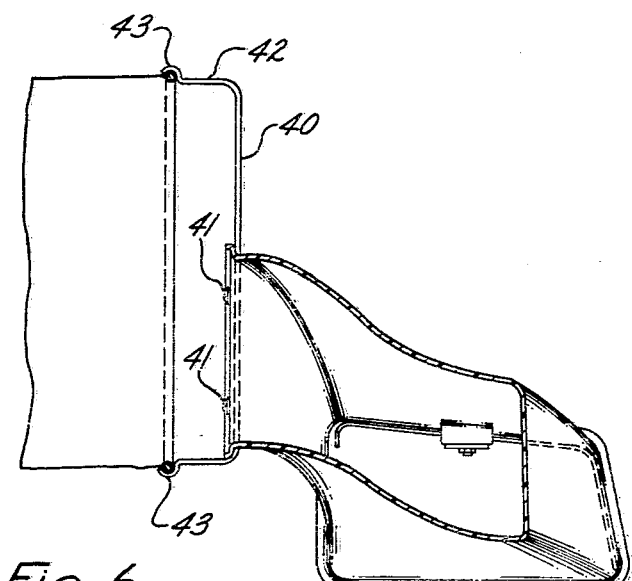
INVENTORS
CHARLES A. MATTSON
GEORGE W. SCHLEICHER
FREDRICK O. OTTOSEN, DECEASED
BY HARRIET OTTOSEN, EXECUTOR
BY George R. Clark
Attorney United States Patent Office 3,143,842
Patented Aug. 11, 1964

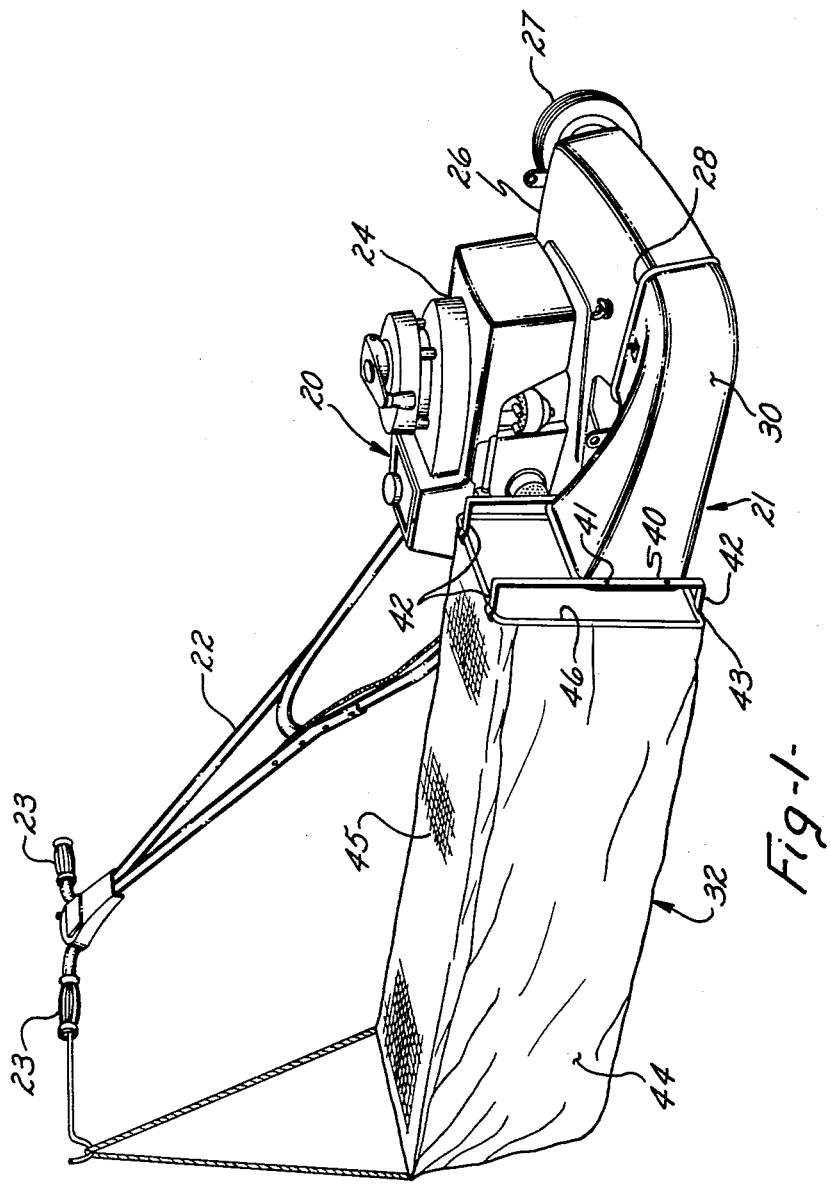

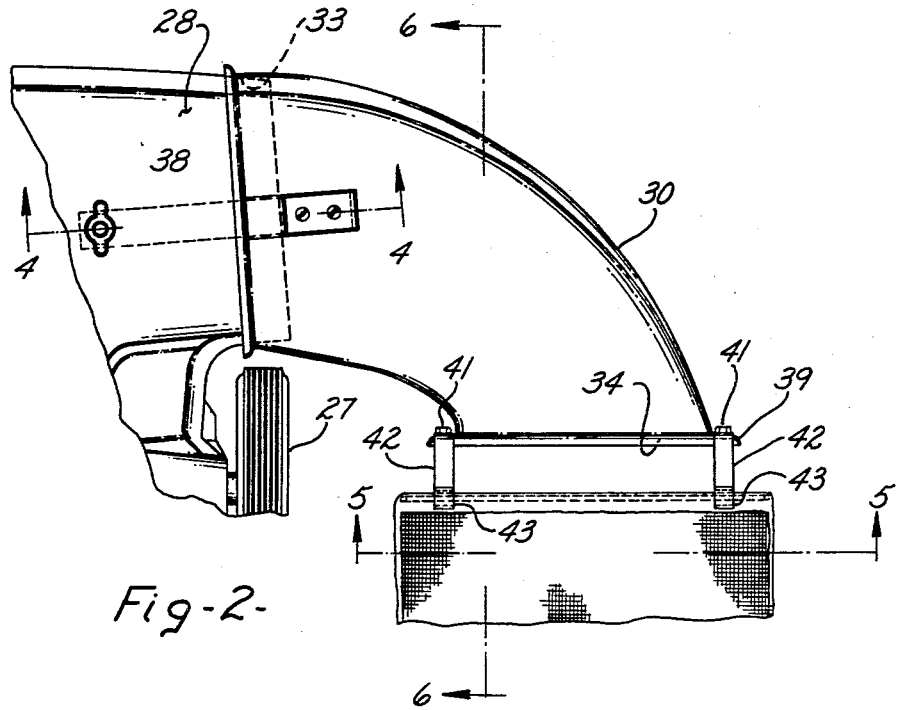
Fig-2-
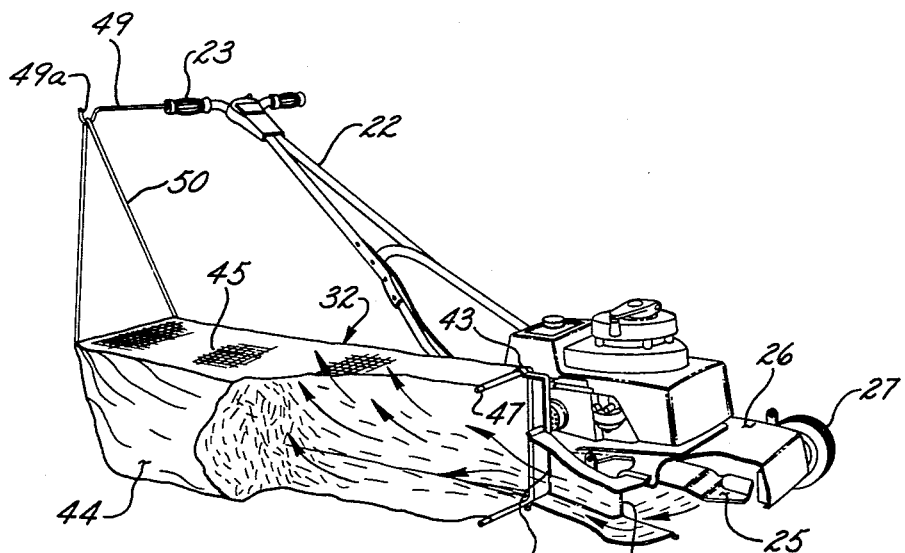
Fig-3-

3,143,842
GRASS CATCHER FOR ROTARY LAWN MOWER
Charles A. Mattson, Oak Park, and George W. Schleicher, Niles, Ill., and Fredrick O. Ottosen, deceased, late of Chicago, Ill., by Harriet Ottosen, executor, Chicago, Ill., assignors to Sunbeam Corporation, Chicago, Ill., a corporation of Illinois
Filed Dec. 26, 1962, Ser. No. 247,401
4 Claims. (Cl. 56—202)

The present invention relates generally to apparatus for collecting grass which has been cut by a lawn mower and more particularly to a grass collecting bag for use with a rotary lawn mower.

In the field of lawn maintenance, it is well recognized that advantages are obtained by collecting the grass clippings produced in the lawn mowing operation rather than depositing the clippings on the lawn. It is thought by many experts in the field that the cut grass clippings tend to stifle the growth or smother the lawn if allowed to remain on the lawn. The easiest and most effective means of preventing the cut grass from remaining on the lawn is to collect the grass clippings during the cutting operation rather than letting them be deposited on the lawn where their removal becomes quite difficult.

There are several design considerations which must be kept in mind in connection with a catcher or collecting means for a lawn mover. It must be light and compact so as not to interfere with the normal operation of the mower. In addition, it must have a large capacity and be easily detachable from the lawn mover for the purpose of emptying the clippings therefrom.

Most of the prior art grass catchers have been deficient in one or more of these areas. It would be desirable, therefore, to provide a grass catching attachment for a rotary lawn mower which is simple in design, light in weight, readily detachable from the mower and easily emptied.

Accordingly, it is an object of the present invention to provide a new and improved grass catching attachment having the various desirable features set forth above.

It is another object of the present invention to provide an improved grass catching bag which has large capacity and is readily detachable from the lawn mower housing.

It is a further object of the present invention to provide a grass catching bag having a large rigid mouth defining rim to facilitate the removal of grass clippings therefrom.

Still another object of the present invention resides in a grass catching attachment including a conduit and a fabric bag, the mouth of the bag being substantially larger than and spaced from the discharge end of the conduit.

Still another object of the present invention resides in the provision of a grass catcher for a rotary lawn mower having an improved mounting arrangement to permit easy detachment of the grass containing portion for emptying the clippings therefrom.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIGURE 1 is a perspective view of a power operated lawn mower equipped with a grass catching attachment built in accordance with the present invention;

FIG. 2 is an enlarged fragmentary top plan view of a portion of the grass catching attachment included in FIG. 1;

FIG. 3 is a perspective view similar to FIG. 1 but showing portions of the grass catching attachment cut away to illustrate the movement of grass and air therein;

FIG. 4 is an enlarged fragmentary sectional view taken on line 4—4 of FIG. 2;

FIG. 5 is a sectional view taken along line 5—5 of FIG. 2, and

FIG. 6 is a sectional view of the grass catching attachment taken along line 6—6 of FIG. 2 with the lawn mower portions removed.

Briefly, the present invention is concerned with a simple, compact and easily detachable grass collecting attachment for a rotary lawn mower. The attachment includes two major parts which are assembled to the lawn mower for the purpose of receiving and storing the grass clippings produced by the mower. The first is a rigid 90° conduit member which is rigidly connected to the discharge opening of the lawn mower housing. The second part is a cloth bag which is provided with a rigid rim or frame secured to the mouth thereof for the purposes of holding the bag open at the mouth and detachably mounting the bag with the mouth aligned with but spaced from the conduit portion mentioned above. Through the utilization of a large mouth in the bag and by spacing the mouth from the relatively small discharge opening in the conduit member, the bag may be filled with a large quantity of grass clippings and may be readily detached from the conduit member for the purpose of emptying the clippings therefrom.

Referring now to the drawings, there is illustrated a lawn mower generally indicated at 20 and a grass catching attachment 21 which is supported thereon. The lawn mower 20 is a conventional rotary type lawn mower having a guiding and operating handle 22 which is provided at its end with outwardly extending hand grips 23. The mower is powered by means of a gasoline engine 24 which includes a vertically extending crankshaft at the lower end of which a cutting blade 25 is mounted for rotation in a generally horizontal plane. The cutting blade 25 is enclosed within an inverted cup-shaped housing 26. To support the mower 20 for movement over the lawn, there are four rubber tired wheels 27 mounted at opposite corners of the housing 26. One of the front wheels is displaced rearwardly to provide clearance for a grass discharge chute 28 which extends toward the side at the front of the housing 26. The structure described thus far including the discharge chute 28 is conventional with most of the rotary lawn mowers made today.

The grass catching attachment 21 includes two major elements, a rigid plastic conduit 30 and a flexible, fabric bag 32 into which the grass clippings are discharged. The purpose of the conduit 30 is to redirect the sidewardly moving grass clippings which are being discharged from the chute 28 and direct them rearwardly into the fabric bag 32. In the operation of the lawn mower 20, it is frequently necessary to mow as closely as possible to fences, trees, bushes, houses and the like. Any unnecessary sideward extension in the form of a grass catching attachment is undesirable since it interferes with the mowing close to the objects and things enumerated above. Through the use of the conduit 30, the grass catching bag 32 may be positioned closely adjacent the lawn mower 20 with a minimum of sideward extension. The conduit 30 may be made of any suitable rigid plastic or metal material. The inner end or end closest to mower housing 26 is formed with a mouth or an entrance opening 33 into which the outer end of the discharge chute 28 extends. At the other end of conduit 30 there is provided a discharge opening 34. As may best be seen in FIG. 2, the entrance opening 33 in the conduit 30 is in a plane 90° from the discharge opening 34, thus the grass moves sidewardly into the conduit 30 and is directed rearwardly before discharging from the opening 34. The discharge opening 34 is positioned substantially above the entrance opening 33, there being an upward inclination in the conduit as it extends between the entrance and the discharge openings. The purpose of the inclination in the conduit 30 is to direct the discharging grass upwardly so as to obtain the maximum distance of throw of grass clippings. This permits the use of an elongated bag which may be completely filled with the grass clippings.

To rigidly connect the conduit 30 to the housing 26, a bracket member 35 is provided which is secured to the conduit 30 by means of bolts 36 as is best shown in FIG. 4. The bracket 35 is positioned within the entrance opening 33 of the conduit 30 and extends outwardly therefrom having an upwardly extending threaded mounting stud 37 on its outer end. The mounting stud 37 is adapted to engage and extend through an opening 26a in the housing 26 for the purpose of retaining the conduit 30 assembled to the housing 26. A wing nut 38 is received on the outwardly extending end of the mounting stud 37. Since the entrance opening 33 of the conduit 30 closely engages the generally converging walls of the discharge chute 28, the single assembly bracket 35 provides a rigid connection between the housing 26 and the conduit 30.

At the discharge end of the conduit 30, an outwardly extending flange 39 is formed. The flange 39 lies in the same general plane as the discharge opening 34 and serves as a mounting for a pair of U-shaped bag support brackets 40. The flange 39 and the support brackets 40 are formed with aligned holes through which assembly bolts 31 extend. The support brackets 40 each have upper and lower horizontally extending legs 42, the outer ends of which are formed with channel-shaped bends 43. The channel-shaped bends 43 are adapted to engage and support the fabric bag 32 in the manner to be explained below. The support brackets 40 are formed of a resilient material so that the legs 42 thereof may be spread apart to detach the fabric bag.

The bag 32 is elongated in shape having a generally uniform and rectangular cross section throughout its length. It may be fabricated of heavy canvas material 44 over most of its wall area. To facilitate the discharge of air from the interior of the bag, at least one wall 45 should be fabricated of a loosely woven, mesh material. In the disclosed embodiments, the porous wall 45 is shown on the upwardly facing wall of the fabric bag 32. It should be understood, however, that one of the side walls might be made the porous wall 45.

The forward end of the fabric bag 32 is provided with a large mouth 46 which is substantially the same in cross section as the remainder of the bag. To maintain the mouth of the bag in its fully open or distended position, a rectangular rim or frame member 47 is employed. The frame member 47 may be fabricated of light steel rod and is assembled to the bag by sewing the fabric thereof around the frame member throughout its length. It should be evident that by utilizing a constant cross sectional area in the bag 32 and an unrestricted open end or mouth 46, grass clippings may be removed from the bag very easily. To assemble the forward end of the fabric bag 32 to the lawn mower, it is simply necessary to place the lower edge of the frame member 47 in the lower channel-shaped bends 43 of the support brackets 40. The upper edge of the frame member 47 is then moved under the upper channel-shaped bends 43 for deflecting the legs 42 upwardly.

In its mounted position on the support brackets 40, the frame member 47 and the bag mouth 46 are spaced rearwardly a short distance from the discharge opening 34 in the conduit 30. In addition, as can best be seen in FIG. 5, the discharge opening 34 is substantially less than half the size of the bag mouth 46. There are a number of reasons behind the relative dimensioning and positioning of these openings. It has been found that the grass discharge conduit should be fairly restricted in cross sectional area to throw the grass clippings a maximum distance. Thus, with the conduit shown in the preferred embodiment, it is possible to throw the grass clippings all the way to the end of the bag 32 remote from the mouth 46. It is necessary to fill the bag from the rear end if it is to be completely filled without the need of having the operator rearrange the clippings during the filling of the bag. Adequate throw of the clippings is best assured by maintaining adequate velocity of the air which carries the clippings. This necessitates providing means whereby the air may quickly escape from the bag 32 without building up a pressure therein. The porous wall 45 aids in this air removal function. In addition, the substantial size of the mouth 46 as compared to the discharge opening 34 of the conduit 30 permits a substantial amount of air to be discharged back through the mouth of the bag 32. The large mouth and frame member 47 also facilitates the emptying of the grass clippings which have accumulated within the bag 32.

The rearwardly extending end of the fabric bag 32 is supported by means of an arm 49 and a string or rope yoke 50. The outer end of the arm 49 is formed with a hook 49a which is adapted to receive the yoke 50. The handle 22 is formed by a pair of tubular members which extend upwardly and are bent outwardly to form the handle grips 23. Since the handle grips 23 are hollow, the bag supporting arm 49 is assembled to the handle 22 by merely inserting it into the tube and then forcing it inwardly until it forms a jammed engagement with the curved portion of the handle tubing. Inasmuch as there is no outward force on the arm 49, there is no tendency for arm 49 to become dislodged from engagement with the handle 22.

Since it is frequently desirable to remove the entire grass catching attachment 21 from the lawn mower 20 when additional trimming is to be performed with the mower in congested areas of a yard, it is extremely desirable that the disassembly may be accomplished easily. In the instant invention it is necessary only to remove the wing nut 38 received on the bracket 35 and withdraw the bag suporting arm 49 from engagement with the handle 22. It should also be appreciated that the detachment of the bag 32 for emptying the grass clippings is very simple requiring only disengagement of the frame member 47 from brackets 40 and the removal of the rope yoke 50 from arm 49.

While there has been illustrated and described what at present is believed to be a preferred embodiment of the present invention, numerous changes and modifications will readily occur to those skilled in the art. It is aimed in the appended claims to cover all those changes and modifications which fall within the true spirit and scope of the present invention.

What is claimed as new and desired to be secured by Letters Patent of the United States is:

1. An attachment for a lawn mower comprising an elongated flexible bag having an unrestricted opening at one end and having a substantially uniform cross-sectional area transverse to its length, a rigid frame member secured to said bag to hold said mouth fully open, means supporting the closed end of said bag from the handle of a lawn mower, a pair of resilient U-shaped brackets supporting said frame member spaced from a grass discharge opening with said bag aligned to receive grass clippings from said mower, said brackets being secured to said mower with the free ends thereof extending toward said bag, said ends being resilient and formed to clamp said frame member between the legs of each bracket for detachably mounting said bag on said mower.

2. An attachment for a rotary lawn mower comprising a rigid conduit removably attached to the discharge chute of said lawn mower to pass grass clippings therethrough, an elongated porous flexible bag having an opening at one end substantially larger than the cross section in said conduit, means supporting the closed end of said bag from said mower, a rigid frame member attached to said bag around the entire periphery of said opening, and bracket means carried by said conduit for detachably mounting said frame member spaced from said conduit with the respective centers of said bag opening and conduit discharge being offset in order that the air forced into said bag under pressure may escape through the area of the bag opening offset from said conduit, said bracket means including a pair of resilient U-shaped brackets secured to said conduit with said frame clamped between the legs of each said bracket.

3. In a power operated rotary lawn mower of the type having a rotary cutter blade with means to generate a high velocity discharge of grass clipping laden air through a lateral outlet in the side of a lawn mower housing, an improved grass clipping collection bag assembly comprising a curved conduit having a first end detachably connected to said lateral discharge outlet and a second end facing rearwardly with respect to said lawn mower, an elongated flexible collection bag having a generally uniform cross section and a mouth at one end which is as large as the cross section of said bag, a frame member attached to said bag at said mouth to maintain the opening at a maximum size, support means adjacent said second end of said conduit for detachably mounting said frame member with the mouth of said bag spaced from said second end of said conduit, said mouth being substantially larger than the conduit opening at said second end, said support means including a pair of resilient U-shaped brackets mounted in spaced positions on said conduit with the legs of said brackets extending rearwardly into gripping engagement with said frame member whereby said legs may be deflected outwardly to detach said frame from said conduit.

4. In a power operated rotary lawn mower of the type having a rotary cutter blade with a means to generate a high velocity discharge of grass clipping laden air through a lateral outlet in the side of a lawn mower housing, an improved grass clipping collection bag assembly comprising a curved conduit having a first end detachably connected to the lateral discharge outlet of the lawn mower housing and the second end facing rearwardly with respect to the lawn mower, said second end being generally rectangular and having a peripheral flange, two U-shaped resilient supporting brackets connected at the bight portion thereof to each side of said flange in an offset position, an elongated flexible collection bag with a generally uniform rectangular cross section having a mouth at one end which is as large as the cross section of said bag and a porous upper surface running the length thereof to allow air but not grass clipping to pass therethrough, a frame member attached to said bag at said mouth to maintain the opening at maximum size, the ends of each said U-shaped bracket clamping said frame therebetween to detachably mount said bag with said mouth in spaced relationship to said second end of the conduit and said second end being offset to one edge of said mouth, said mouth being substantially larger than said second end whereby the grass laden air can be propelled through the conduit and discharged into the collection bag with the air exiting through the porous upper bag surface and as the bag is packed with clippings which decrease the effective discharge area of said porous surface through the area of the mouth which is offset from said second end.

References Cited in the file of this patent
UNITED STATES PATENTS

| | | |
|---|---|---|
| 2,932,146 | Campbell | Apr. 12, 1960 |
| 2,970,422 | Kroll et al. | Feb. 7, 1961 |

FOREIGN PATENTS

| | | |
|---|---|---|
| 1,228,918 | France | Sept. 2, 1960 |